(12) United States Patent
Moran-Mirabal et al.

(10) Patent No.: US 8,541,940 B2
(45) Date of Patent: Sep. 24, 2013

(54) ELECTROSPUN LIGHT-EMITTING FIBERS

(75) Inventors: Jose M. Moran-Mirabal, Ithaca, NY (US); Harold G. Craighead, Ithaca, NY (US); George G. Malliaras, Ithaca, NY (US); Héctor D. Abruna, Ithaca, NY (US); Jason D. Slinker, Pasadena, CA (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 13/337,977

(22) Filed: Dec. 27, 2011

(65) Prior Publication Data

US 2012/0097832 A1    Apr. 26, 2012

Related U.S. Application Data

(63) Continuation of application No. 12/233,340, filed on Sep. 18, 2008, now Pat. No. 8,106,580.

(60) Provisional application No. 60/973,326, filed on Sep. 18, 2007.

(51) Int. Cl.
*H01L 51/50* (2006.01)
*H01L 51/52* (2006.01)
*H01L 51/54* (2006.01)

(52) U.S. Cl.
USPC ........... 313/503; 313/502; 313/507; 313/512; 362/551; 428/401

(58) Field of Classification Search
USPC ................. 313/498–512; 428/551; 362/200, 362/500
See application file for complete search history.

(56) References Cited

U.S. PATENT DOCUMENTS

| | | | |
|---|---|---|---|
| 6,259,838 B1 * | 7/2001 | Singh et al. | 385/31 |
| 7,884,004 B2 * | 2/2011 | Bangsaruntip et al. | 438/586 |
| 2003/0017208 A1 * | 1/2003 | Ignatious et al. | 424/486 |
| 2003/0099858 A1 * | 5/2003 | Duggal et al. | 428/690 |
| 2003/0168756 A1 * | 9/2003 | Balkus et al. | 264/10 |
| 2003/0168964 A1 * | 9/2003 | Chen | 313/495 |
| 2004/0212301 A1 * | 10/2004 | Duggal et al. | 313/511 |
| 2005/0079659 A1 * | 4/2005 | Duan et al. | 438/197 |
| 2007/0012980 A1 * | 1/2007 | Duan et al. | 257/296 |
| 2007/0042181 A1 * | 2/2007 | Naito et al. | 428/402 |
| 2007/0126341 A1 * | 6/2007 | Kawai | 313/503 |
| 2008/0220678 A1 * | 9/2008 | Neudeck et al. | 442/110 |
| 2010/0040986 A1 * | 2/2010 | Yamaguchi et al. | 430/321 |
| 2010/0155696 A1 * | 6/2010 | Duan et al. | 257/14 |
| 2010/0264812 A1 * | 10/2010 | Akino et al. | 313/504 |

FOREIGN PATENT DOCUMENTS

WO    WO 2007046201 A1 *    4/2007

* cited by examiner

*Primary Examiner* — Anne Hines
*Assistant Examiner* — Jose M Diaz
(74) *Attorney, Agent, or Firm* — Fahmi Sellers Embert & Davitz

(57) ABSTRACT

The invention teaches electrospun light-emitting fibers made from ionic transition metal complexes ("iTMCs") such as $[Ru(bpy)_3]^{2+}(PF_6^-)^2$/PEO mixtures with dimensions in the 10.0 nm to 5.0 micron range and capable of highly localized light emission at low operating voltages such as 3-4 V with turn-on voltages approaching the band-gap limit of the organic semiconductor that may be used as point source light emitters on a chip.

36 Claims, 14 Drawing Sheets

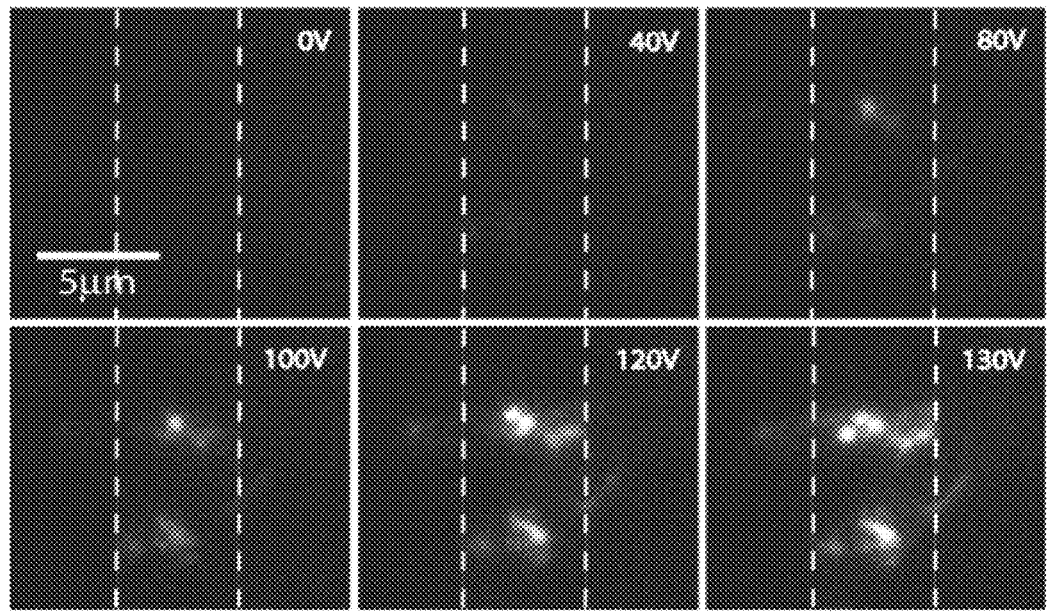
*FIG. 3C*
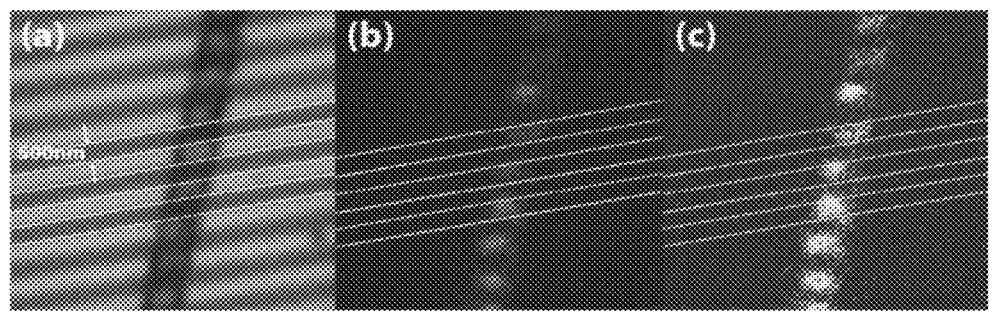
*FIG. 4A*  *FIG. 4B*  *FIG. 4C*

ELECTROSPUN LIGHT-EMITTING FIBERS

CROSS REFERENCE TO RELATED APPLICATION

This application is a continuation of U.S. application Ser. No. 12/233,340, filed on Sep. 18, 2008, which claims the benefit under 35 U.S.C. §119(e) of U.S. Provisional Application No. 60/973,326, filed on Sep. 18, 2007, the disclosures of each of which are hereby incorporated by reference in their entireties.

STATEMENT OF GOVERNMENT RIGHTS

This invention was made with Government support under Award Number EEC-0117770, awarded by the Nanoscale Science and Engineering Initiative of the National Science Foundation (NSF); this work was supported by the New York State Office of Science, Technology and Academic Research (NYSTAR) and performed in part at the Cornell NanoScale Facility, a member of NNIN, supported by NSF Grant ECS 03-35765. This work also made use of the Cornell Center for Materials Research Shared Experimental Facilities, Keck-SEM, supported through the NSF MRSEC program (DMR-0520404). The government has certain rights in this invention.

FIELD OF INVENTION

The present invention relates to light-emitting fibers and more particularly electrospun light-emitting fibers that show highly localized light emission at low operating voltages.

BACKGROUND

Light-emitting sources with constrained dimensions have received much attention because of their importance in sensing and lab-on-a-chip applications. B. Choudhury, et al., J. J. Appl. Phys. 2004, 96 (5), 2949-2954; J. B. Edel et al., A. J. Lab Chip 2004, 4 (2), 136-140. The ability to shrink the size of an illumination source and couple it with on-chip detection mechanisms can enable the production of fully packaged, functional devices that operate without the need of external optics. This can, in turn, enhance the sensitivity and improve the signal-to-noise ratio of detected fluorescence by limiting the number of interfaces through which the emitted light has to propagate. Seo, J.; Lee, L.P. Sens. Actuators, B 2004, 99 (2-3), 615-622. However, most state of the art lab-on-a-chip devices use external illumination sources, such as lasers or light emitting diodes (LEDs). Even though LEDs are relatively inexpensive and can have submillimeter size, they are still much larger than the typical micro- or nanofluidic device and have to be mounted outside of the sensing region. Some attempts have been made at fabricating on-chip point sources that can be coupled to micro- and nanofluidic devices. However, these point sources are usually much larger than the fabricated devices, can be expensive to fabricate, or do not emit light in the visible spectrum. Light-emitting devices based on organic semiconductors have been demonstrated as efficient sources with characteristics that make them attractive for flat panel displays, lighting, and sensing applications. Holder, E.; Langeveld, B. M. W.; Schubert, U.S. Adv. Mater. 2005, 17 (9), 1109-1121. For many of these materials, the organic semiconductor can be deposited directly from solution, thus affording ease of fabrication. Within the class of solution processable organic electroluminescent materials, mixed conductors such as ionic transition metal complexes ("iTMCs") have emerged as materials that allow the fabrication of efficient, single-layer light-emitting devices employing air stable electrodes. Bernards, D. A.; Flores-Torres, S.; Abruna, H. D.; Malliaras, G. G. Science 2006, 313 (5792), 1416-1419; Bernhard, S.; Barron, J. A.; Houston, P. L.; Abruna, H. D.; Ruglovksy, J. L.; Gao, X. C.; Malliaras, G. G. J. Am. Chem. Soc. 2002, 124 (45), 13624-13628. These features are a consequence of the operational mechanism of iTMC light-emitting devices, which is similar to that of polymer light-emitting electrochemical cells. In these materials, ionic space charge effects lead to both enhancement of electronic charge injection (enabling the use of air-stable electrodes) and a light emission profile confined to a thin region of the active area between the electrodes. These characteristics make organic light-emitting devices, and in particular iTMC devices, attractive candidates for on-chip light sources.

In this sense, having a light-emitting fiber based on an iTMC could provide a highly localized point source emission profile, with the axial dimension restricted by the iTMC operational mechanism and the radial dimension given by the diameter of the fiber. Such fibers also enable multiple highly localized point sources for lab-on-chip applications that existing formats do not allow. Moreover, such light-emitting fibers can be synthesized a simple electrospinning process. Electrospun light-emitting fibers based on iTMCs show distinct advantages: the emission zone is three-dimensionally confined to sub-wavelength dimensions; the emission dimensions are similar to the smallest light emitting sources produced to date (based on nanowires) but are produced using the far less involved and inexpensive fabrication techniques of electrospinning; the illuminated fibers have relatively long life-times; the brightness of light emission can be easily controlled by the applied voltage; and the color of the emission can be tuned by varying the iTMC complex used in the fiber.

SUMMARY OF THE INVENTION

The invention teaches electrospun light-emitting fibers ("ELFs") comprising mixed conductors embedded in a suitable carrier substance that emit light. In one embodiment, these ELFs show highly localized light emission confined to nanoscale dimensions when subject to low operating voltages. In one embodiment of the invention, the mixed conductors are iTMCs or ionic solutions; in another embodiment of the invention, the mixed conductors are embedded in a polymeric substance that enables the electrospun fiber to emit light at low operating voltages (for example, between 3-4 V), with turn-on voltages approaching the band-gap limit of the semiconductor of which the nanofibers are spun. The diameter of the fibers range from between about 10.0 nm to about 50.0 microns, particularly between about 75.0 nm to about 1000.0 nm, more particularly between about 100.0 nm to about 600.00 nm, and most particularly between about 200.0 to about 400.0 nm. Fibers with diameters less than about 1.0 microns (1000.0 nm) in the nano-dimension range are referred to as nanofibers. The emission zone from ELFs is three-dimensionally confined to sub-wavelength dimensions, precision that surpasses the diffraction limit of conventional optical lenses. The brightness of the light emission is controlled by the applied voltage. The color of the emission can be tuned by choice of the iTMCs or ionic solutions, which have been shown to emit across the visible spectrum and have potential as infrared emitters.

The ELFs of the invention offer ease of fabrication, as they can be spun directly from solution onto devices such as electrodes of micrometer or nanometer dimensions. Compatibility with micrometer dimensions precludes the need for electron-beam lithography, a costly requirement for comparably-sized nanoscale light emitters. When an ELF is deposited on interdigitated electrodes, light emission occurs along the fiber in the gaps between the electrodes, facilitating the fabrication of well-defined arrays of nanoscale light emitters. Such devices could be fabricated on a variety of surfaces, including those that are biologically or chemically modified.

In one embodiment of the invention, light-emitting fibers made from ($[Ru(bpy)_3]^{2+}(PF_6^-)_2$)/PEO mixtures with dimensions in the 150.0 nm to 5.0 micron range were produced via the electrospinning method. In one embodiment, fibers were successfully spun on, and thus lit on devices containing interdigitated electrodes ("IDEs") with interelectrode gaps of between 500 nm and 5.0 microns. Light emission from the fibers spun on 500 nm IDEs was readily detectable with a CCD camera with voltages as low as 3.2 V and visible to the naked eye at 4 V, with turn-on voltages approaching the band gap limit for the semiconductor (approximately 2.6 eV for the ruthenium complex above; approximately 1.5 eV for visible light emitters). Emission from the fibers was found to be highly confined to planar regions $10^2$-$10^6$ $nm^2$ or smaller, with imaged emission areas small enough to be limited by diffraction of the microscope. Thus, the electrospun light-emitting fibers are suitable for all applications for which extremely localized light emission is necessary. Specifically, the light sources could be easily integrated into micro- and nanofluidic devices for on-chip illumination. Applications include, but are not limited to the enablement of full integration of excitation and detection mechanisms on lab-on-a-chip devices, nanometer scale sensing, spectroscopy applications, displays, etc. The existence of iTMCs with emission at different wavelengths in the visible spectrum also enables the production of nanoscopic light emitting sources that can excite multiple fluorescent tags. The fibers may also be integrated into flexible electronics, suitable fabrics (e.g., for protective clothing).

BRIEF DESCRIPTION OF THE DRAWINGS

Certain embodiments of the present invention are illustrated by the accompanying figures. It should be understood that the figures are not necessarily to scale and that details not necessary for an understanding of the invention or that render other details difficult to perceive may be omitted. It should be understood, of course, that the invention is not necessarily limited to the particular embodiments illustrated herein.

FIG. 2 shows that electroluminescence from ELFs deposited on 5 micron and 500 nm IDEs show highly localized emission.

FIG. 4 depicts light emission from multiple interelectrode gaps can be observed for a single fiber. FIG. 4(a) is a bright field image of an electrospun fiber spanning several 500 nm IDE gaps. Electrode gaps have been outlined. FIG. 4(b) depicts mission from fiber imaged in FIG. 4(a) at 4 V. FIG. 4(c) is a pseudocolor rendition of FIG. 4(b) for comparison of intensity in individual gaps.

FIG. 5 depicts current and luminance responses to an applied bias for fibers deposited on 5 micron and 500 nm IDEs. Plots represent characteristic behavior for a single emission zone. Error bars on all luminance measurements represent intensity variations along the 15 s during which each voltage was applied.

DETAILED DESCRIPTION

Figure 1A:
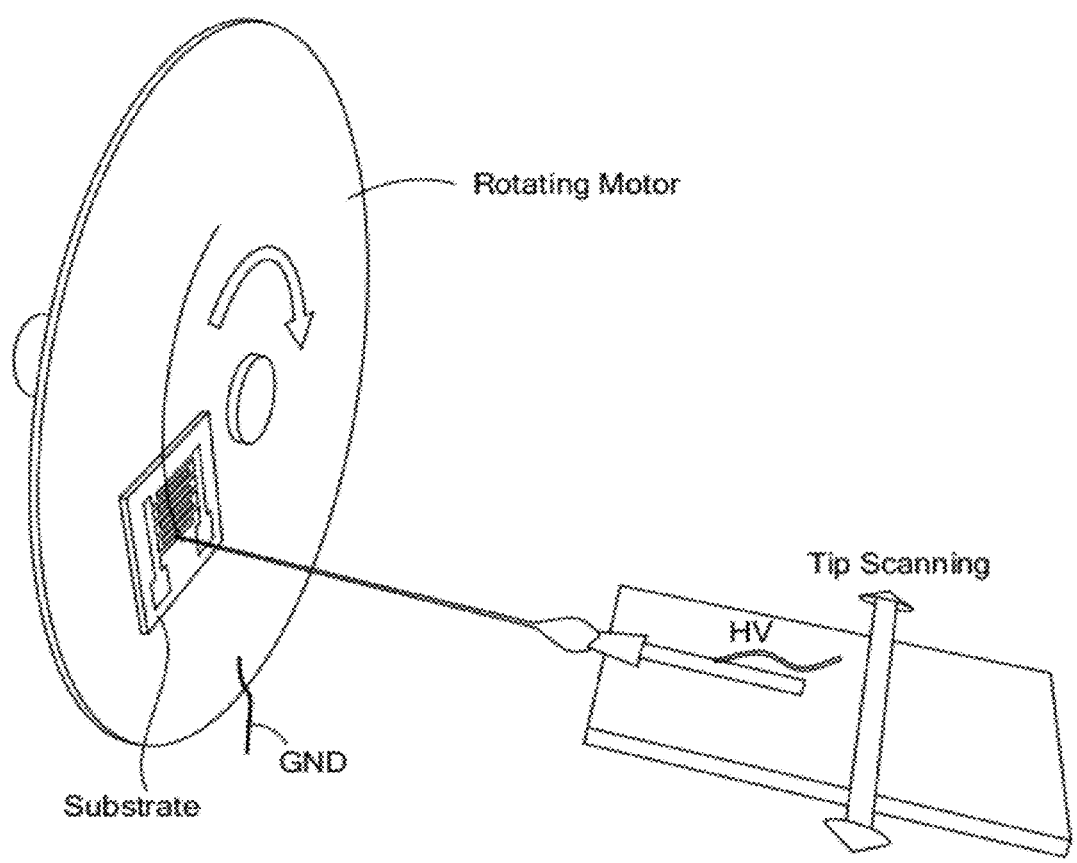
FIG. 1(a) is a schematic of the electrospinning setup used to deposit the fibers on the substrate. Fibers are oriented by the rotating motion of the substrate. Oriented fibers are obtained over a wide area by scanning the tip sideways.

Electrospun light-emitting fibers ("ELFs") of the present invention comprise an electroluminescent material, preferably one that is solution processable, and a carrier substance, where the electroluminescent material is embedded in the carrier substance, such that the ELF to emit light, preferably at low operating voltages. In one embodiment of the invention, the electroluminescent material is an electroluminescent organic material. The electroluminescent organic material is preferably a mixed conductor, a material that has more than one mechanism of conducting charge. Preferably, the mixed conductor is an ionic transition metal complex ("iTMC"). An iTMC, or alternately a transition metal coordination compound, describes molecules or ensembles formed by the combination of transition metal ions and ligands, where the ligands comprising ions or molecules surround a transition metal ion and are generally bound to it by a coordinate covalent bond. The transition metal is not particularly limited; preferably the transition metal is any transition metal with electroluminescent properties; more preferably the transition metal is ruthenium, rhodium, palladium, tungsten, rhenium, osmium, iridium or platinum; most preferably the transition metal is ruthenium.

The ligands of the iTMC include, but are not limited to, classic ligands that bind to metals, almost exclusively, via their "lone pairs" of electrons residing on the main group atoms of the ligand (for example, $H_2O$, silyl, $NH_3$, $Cl^-$, $CN^-$, $en^-$, etc.); organic ligands (for example, alkene, alkyne, alkyl, aryl, arylene, alkoxy, aryloxy, a heterocyclic aromatic group such pyridines, bipyridines, pyrimidines, etc.) as well as "organic-like" ligands (for example, phosphines, hydride, CO, etc.); biological ligands (for example, amino acids, side chains of amino acids, peptides, peptide fragments, proteins, cofactors such as porphyrins (for example, hemoglobin), etc.), and combinations thereof. Preferably, the ligands are organic ligands; more preferably, the ligands are those with a heterocyclic aromatic group; more preferably, the ligands are pyridines, bipyridines, and pyrimidines. One preferable class of ligands di-immine-type ligands and their derivatives. A preferred class of iTMCs are those bearing the ruthenium(II) tris(bipyridine) cation ($[Ru(bpy)_3]^{2+}$), including, but not limited, to ruthenium(II) tris(bipyridine)hexafluorophosphate ($([Ru(bpy)_3]^{2+}(PF_6^-)_2$) and ruthenium(II) tris(bipyridine) dichloride ($[Ru(bpy)_3]^{2+}(Cl^-)_2$).

The iTMCs may be embedded in a carrier substance, that is preferably a polymeric substance. Such polymer substances include, but are not limited to, conjugated polymers, copolymers, block co-polymers, partially cross-linked polymers, biodegradable polymers including poly(propylene fumarate) ("PPF"), tyrosine-derived polymers, segmented polyurethane-based polymers, polyphosphoesters, polyphosphazenes, polyanhydrides, poly(ortho esters) and dendrimers. Preferably, the polymers comprise polyethers, polyethylene oxide ("PEO"), polymethyl-methacrylate ("PMMA"), polycarbonate, polyvinyl alcohol, polyvinyl acetate, polystyrene, polyglycolic acid, polylactic acid, water-soluble vinyl polymers (for example, polyvinyl alcohol ("PVA"), polyvinyl ether and polyvinyl pyrrolidone), and block co-polymers comprising combinations of two or more of any of the aforementioned polymers; more preferably, the polymers comprise polyethers such as polyethylene glycol ("PEG"), polyethylene oxide ("PEO"), polypropylene oxide ("PEP") and their co-polymers, for instance, poly(ethylene glycol-co-propylene oxide) ("PEG-PPO"). The fibers are relatively thin with diameters similar to those of nanowires. The diameter of the fibers range from between about 10.0 nm to about 50.0 microns, particularly between about 75.0 nm to about 1000.0 nm, and more particularly between about 100.0 nm to about 600.00 nm, and most particularly between about 200.0 to about 400.0 nm. Fibers with diameters less than about 1.0 microns (1000.0 nm) may be referred to as nanofibers.

When subjected to low voltages of between 1-10 V, preferably 2-8 V, more preferably 3-4 V, the fibers show highly localized light emission. In one preferred embodiment, the turn-on voltages approach the band-gap limit of the semiconductor of which the nanofibers are spun. For example, light emission was observed at approximately 3.2 V for the ruthenium complex $[Ru(bpy)_3]^{2+}(PF_6^-)_2$ having a band gap of approximately 2.6 eV. The point-source emission profile generated by the fibers, in particular the nanofibers of the invention are restricted by the iTMC operational mechanism including the choice of mixed conductor, carrier substance, etc. and the radial dimension of the fiber. Thus, for instance, emission from the fibers could be highly localized to planar dimensions of between $10^2$-$10^6$ $nm^2$, or smaller. For instance, in one embodiment of the invention, the planar dimensions observed were about 200×300 $nm^2$ (6×$10^4$ $nm^2$). In another embodiment, the planar dimensions were about 10×10 $nm^2$.

To make the ELFs of the present invention, electrospinning may be employed. In a typical electrospinning setup, high voltage is applied to a droplet of the solution that rests on a sharp conducting tip. As a result of molecular ionization and charge redistribution, a Taylor cone is formed and a jet of the solution is extracted. The formed jet is then accelerated by the electric field and collected on a grounded substrate as shown in FIG. 1. When a volatile solvent is used, in-flight solvent evaporation occurs, hardening the fibers composed of the dissolved material, which are deposited on the substrate. In one embodiment of the invention, the ELFs can be deposited on substrates bearing conducting electrodes, thus facilitating mechanical, optical, and electrical interrogation of the fiber properties. In another embodiment of the invention, the electrospinning technique deposit fibers containing electroluminescent iTMCs imbedded in a polymer electrolyte on inter-digitated electrodes to produce point illumination sources. In yet another embodiment, the ELFs are deposited onto substrates, preferably comprising interdigitated electrodes, such that the arrangement of the ELFs on the substrate creates an array of high-resolution emissive materials. The emission zones of these fibers need not be limited to nanoscale emission. The size of the emission zone can be controlled through control of the fiber diameter and the distance between electrodes. In a preferred embodiment, the ELFs are deposited parallel to each other.

Depending on the polymers and the iTMCs used, it is important to carefully determine the optimal concentration of the carrier polymer as it controls the solution viscosity and, thus, the thickness of the fiber obtained from electrospinning. In one embodiment of the invention for which polyethylene oxide ("PEO") was used as the polymeric substance, it was determined that varying the % concentration of the PEO between 1-4% while holding the concentration of the iTMC constant at 50 mM allowed the polymer and the iTMC to completely dissolve in acetonitrile with no deleterious effects on solution viscosity or resulting luminescence. The concentration of the iTMCs, can range between 10 mM to about 200 mM, preferably higher than about 50 mM. At lower concentrations of the iTMC, luminescence may be compromised for some combinations of polymers and iTMCs. At higher concentrations, iTMC can phase separate from the polymer. Thus, the optimal concentrations of iTMC are those that enable luminescence but are not so high as to cause phase separation in the electrospinning solution.

In one embodiment, the electrospinning solution may be doped with an ionic conductivity enhancing material. Such materials include, but are not limited to, ionic liquids (for example, 1-butyl-3-methylimidazolium), tetra-alkyl ammonium hexafluorophosphates, and tetra-alkyl ammonium tetrafluoroborates, and thermosetting polymers. The molar ratio of the ionic liquid to iTMC is about 0.05 to about 0.5, preferably about 0.1 to about 0.2. In yet another embodiment of the invention, a combination of polymer electrolytes and salt solution may be used. The molar ratio of the salt to iTMC is about 0.05 to about 0.5, preferably about 0.1 to about 0.2.

In another embodiment, additives can be added to control/modulate viscosity. Such additives include, but are not limited to, acetone, acetonitrile, dimethylsulfoxide and dimethylformamide. In yet another embodiment, additives allowing post-processing such as thermal or photo processes may be added, for example, styrene and di-vinylbenzene. In one embodiment of the invention, the substrate used to collect the fibers is a silicon-bearing substrate. In another embodiment, the substrate includes glass or plastic components. In yet another embodiment, the substrate is an organic substrate. Organic substrates include, but are not limited to, pentacene. $Alq_3$, Poly(p-phenylene vinylene) ("PPV") and tetraphenyl diamine bearing substrates. Alternative embodiments include silicon substrates with bioorganic substances that include, but are not limited to, nucleic acids, proteins, peptides, viruses, viral fragments, cells; nanofluidic channels, quantum dots, carbon nanotubes, ceramics, general photovoltaic compounds and photoluminescent materials. In one embodiment, the substrate used to collect the fibers may comprise thermal oxide as an insulating layer with micropatterned gold interdigitated electrodes ("IDEs") on top. The thickness of the thermal oxide is between about 100-1,000 nm, preferably between about 200-800 nm, more preferably between about 300-600 nm.

In another embodiment of the invention, the fibers may be encapsulated to reduce any impact of oxygen or ambient moisture on fiber performance. The encapsulation may be performed during the electrospinning step using suitable co-axial electrospinning methods; in another embodiment, the fibers may be encapsulated post-spinning. Suitable encapsulation materials include, but are not limited to, polymers and oxides, particularly those oxides that allow the encapsulation material to be made very thin using atomic layer deposition. Such oxides include, but are not restricted to, silicon oxide and aluminum oxide. In one embodiment, the fibers may be encapsulated in glass. In yet another embodiment, the space between the fiber and the encapsulating material may comprise an inert gas, for example, nitrogen, argon, and helium.

In one embodiment of the invention, the ELFs are used as light emitters on a chip. In one embodiment of this "light-emitter on a chip" application, the ELFs create light emission sites on micro/nanofluidic devices which can elicit fluorescence from tagged molecules (which can be also be detected by on-chip photon detectors). In another embodiment of the invention, the ELFs can be used as sensing devices, preferably by using the ELFs to locally excite a secondary fluorescing material or analyte of interest, and detecting that secondary emission. In yet another embodiment in which the ELFs can be used as sensing devices, the ELFs may be modified with an analyte, for example, a biological or chemical receptor/recognition element, such that the detection is recognized through enhanced or diminished emissive flux of the light emitting device itself. The chemical receptor/recognition element could be included in either the carrier polymer, included in the ligands on the transition metal complex, co-mixed with the complex/polymer solution, or coated on the ELFs. In one embodiment, chromogenic and/or fluorogenic agents capable of detecting gases (for example, sarin gas) are blended into the carrier polymer and/or iTMC, or coated onto the fibers. Preferably such agents comprise amine groups.

In another embodiment, the ELF has two iTMCs—one possessing mobile positive counter ions with stationary negatively charged complexes, and the other possessing mobile negative counter ions with stationary positively charged complexes, creating an "ionic PN junction" and a subsequent photoresponse. An ELF in which the negatively and positively charged complexes are blended in the same ELF is photoresponsive in that it produces a photovoltage or photocurrent. Such an ELF may be used as a light detector. In yet another embodiment, an ELF containing only the positive complex, and an ELF containing only the negative complex, may be electrospun on a substrate such the two ELFs intersect to create an overlap that is photoresponsive. A device comprising such an arrangement of ELFs may be used for extremely localized light detection.

The present invention is illustrated, but in no way limited by the following examples.

EXAMPLES

Example 1

Figure 1B:
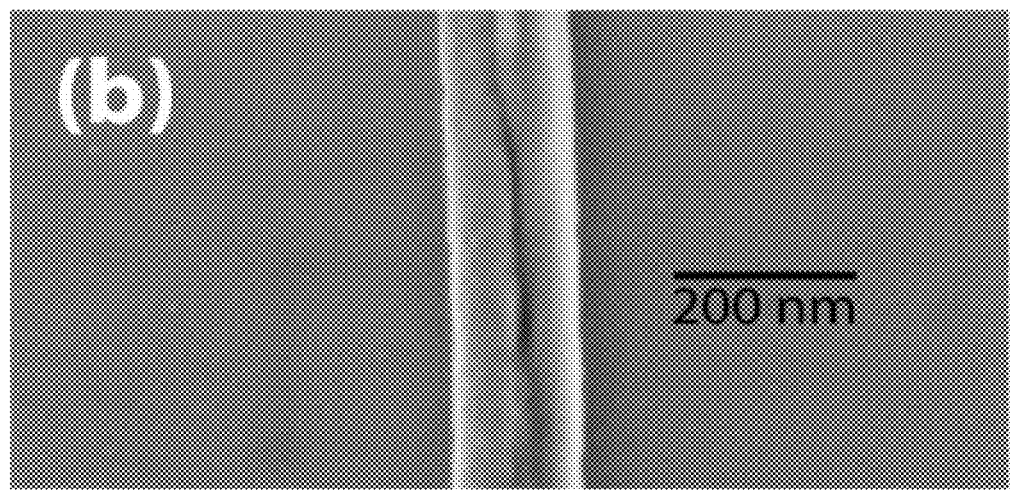
FIG. 1(b) is a scanning electron micrograph of an electrospun fiber with a diameter of 150 nm.
Figure 1C:
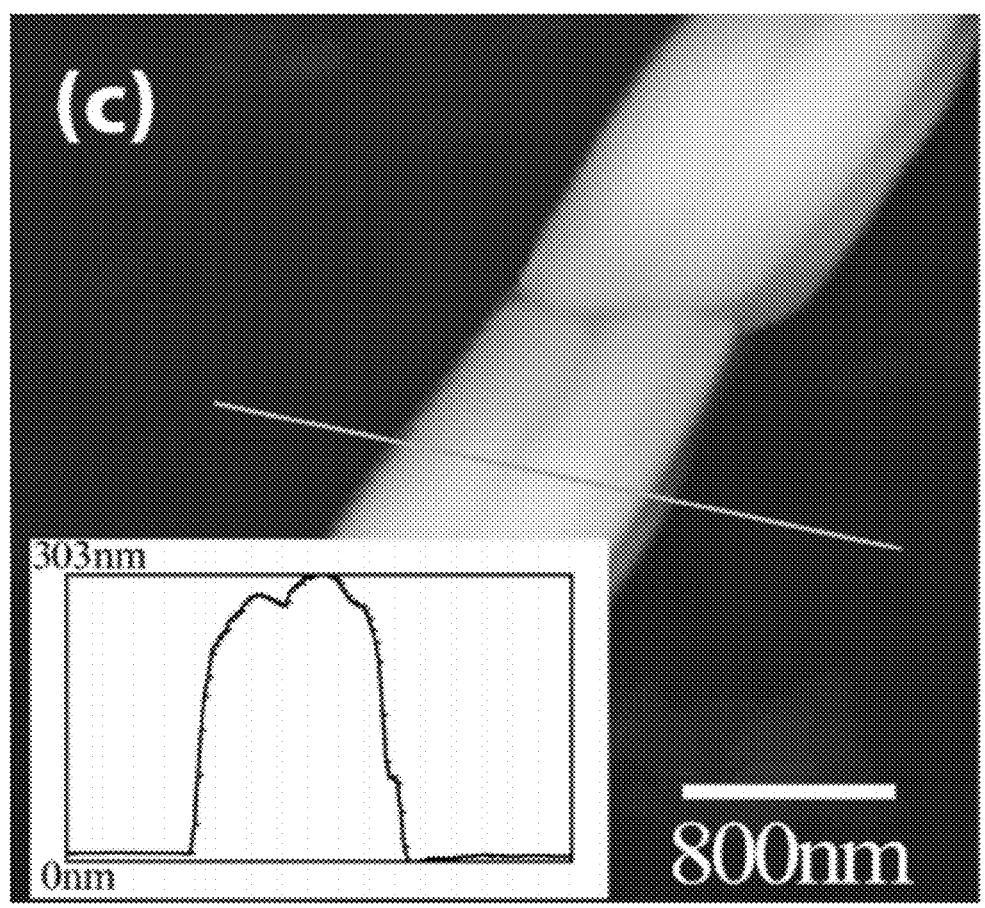
FIG. 1(c) is an atomic force micrograph of an electrospun fiber with ~300 nm height.
Figure 2A:
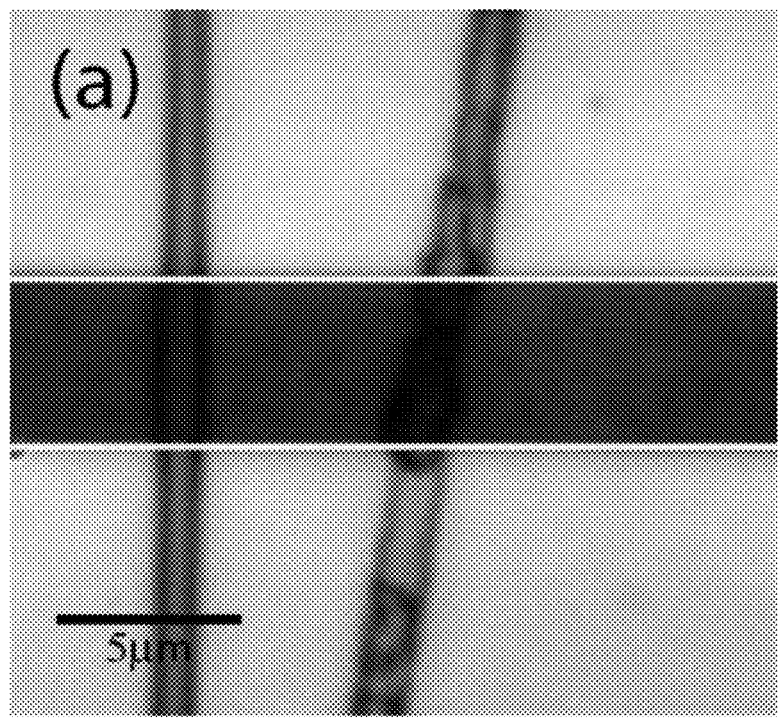
FIG. 2(a) is a bright field image of two fibers on a 5 micron IDE gap, outlined by white lines.
Figure 2B:
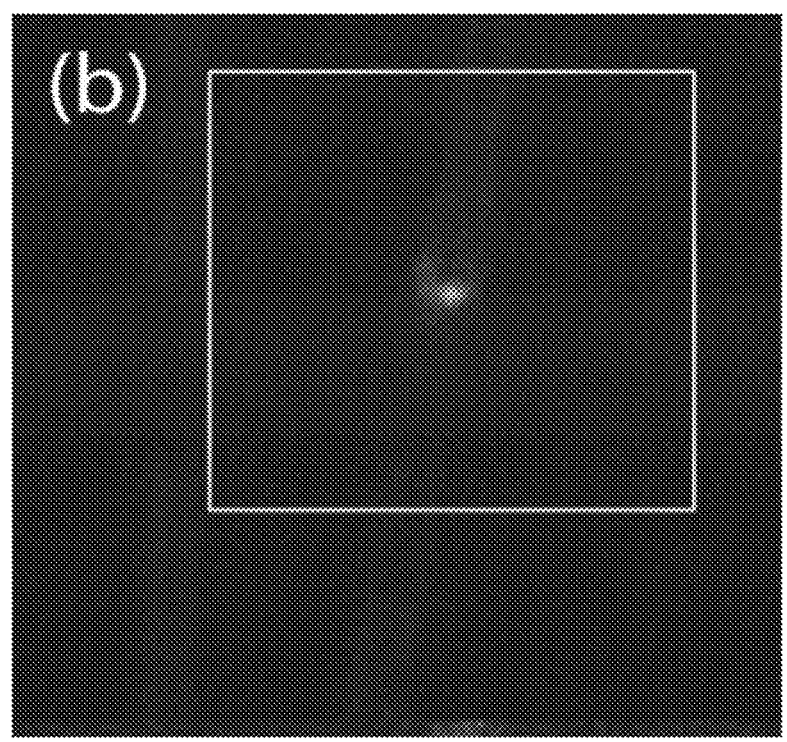
FIG. 2(b) depicts emission from the right fiber imaged in (a) captured with 100 ms exposure.
Figure 2C:
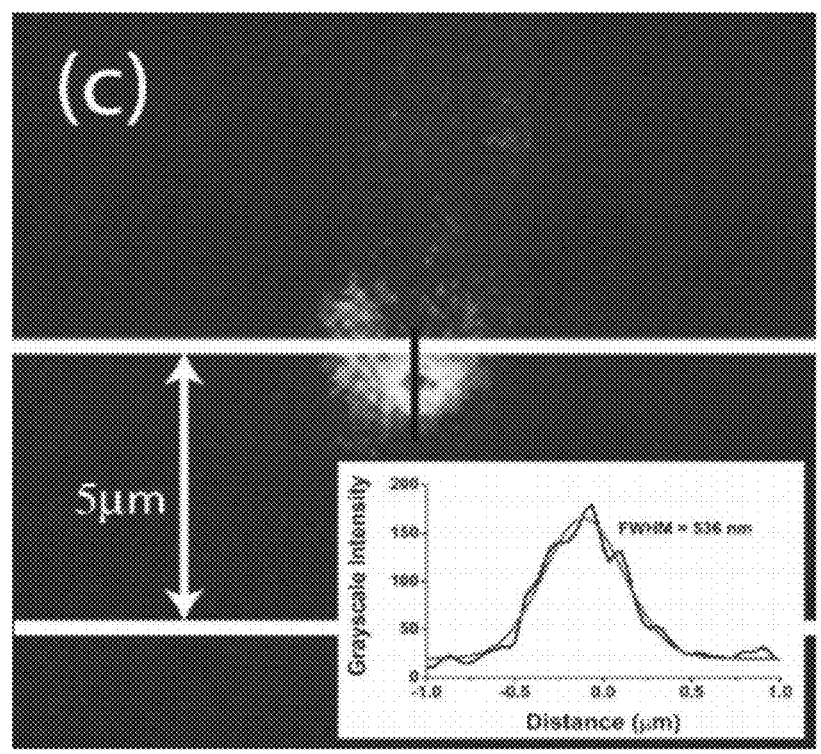
FIG. 2(c) is a pseudocolor rendition of the square in FIG. 2(b) to illustrate intensity, white line marks the top of the IDE gap outlined in FIG. 2(a). Inset: intensity profile from line spanning the emission zone. Full width at half-maximum (fwhm) of the peak corresponds to 536 nm.
Figure 2D:
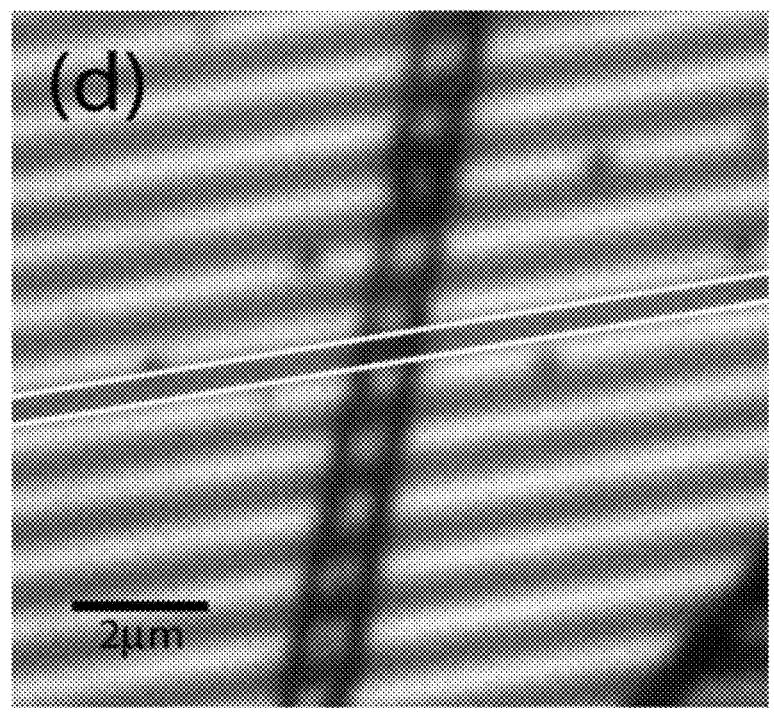
FIG. 2(d) is a bright field image of a single fiber spanning multiple 500 nm IDE gaps. A single gap where light emission occurs is outlined by two white lines.
Figure 2E:
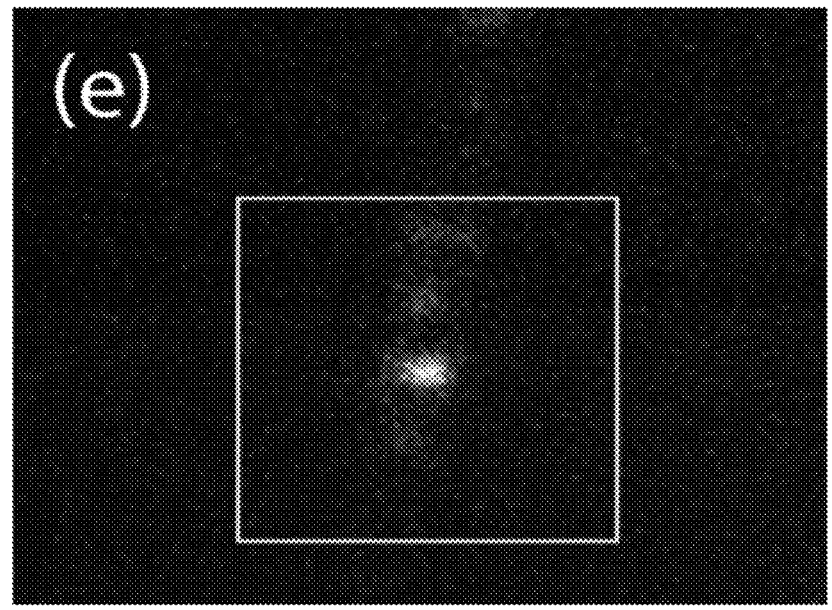
FIG. 2(e) depicts emission from fiber imaged in FIG. 2(d), captured with 100 ms exposure. Intense light emission is observed from only one IDE gap.
Figure 2F:
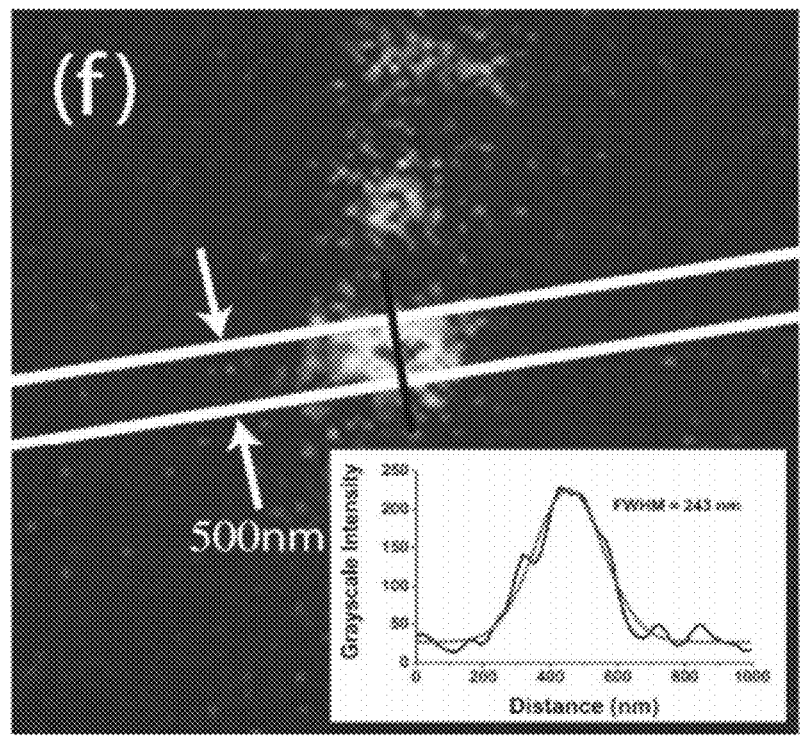
FIG. 2(f) is a pseudocolor rendition of square in FIG. 2(e), white lines mark the limits of the IDE gap outlined in FIG. 2(d). Inset: intensity profile from line spanning the emission zone. fwhm) 240 nm.

Effect of PEO Concentration on Electrospun Ruthenium(II) tris(bipyridine) Fibers A solution used for electrospinning was made by dissolving ruthenium(II) tris(bipyridine) ($[Ru(bpy)_3]^{2+}(PF_6^-)_2$) in dry acetonitrile at 50 mM concentration. The solution was then filtered through a 450 nm polycarbonate membrane to remove large particle impurities. Poly(ethylene oxide) (PEO, $10^6$ Da MW, Sigma) was subsequently added as a carrier polymer at 1-3% weight/weight ratio (10-30 nM concentration of PEO polymer). The variation in the PEO percentage allowed tuning the viscosity of the electrospinning solution which affected the size of the deposited fibers. In addition to the ease of electrospinning allowed by the material properties of PEO, it has been also shown that PEO can have a positive impact on the electrical characteristics of ruthenium complex devices. Although PEO was used in this example, other polymers (for example, substances such as poly(methyl methacrylate), polycarbonate, and polystyrene which have also been blended with metal complexes and used to make thin-film light-emitting devices) may also be used. The ELFs were then electrospun using a microfabricated tip coated with a thin gold layer in a setup as depicted in FIG. 1a. The voltage used for electrospinning was varied between 8 and 10 kV, and the tip-to-substrate distance was kept between 25 and 40 mm. The resulting fibers had diameters that ranged from 150.0 nm produced with 1% PEO solution to fibers of several microns made from 3% PEO solution, as confirmed by scanning electron microscopy ("SEM") as shown in FIG. 1(b) and atomic force microscopy profiles as shown in FIG. 1(c). Some fibers electrospun with 3% PEO content showed phase separation between the polymer and the transition metal complex.

Example 2

Electrospinning Fibers onto 500 nm and 5.0 Micron Devices

Figure 3A:
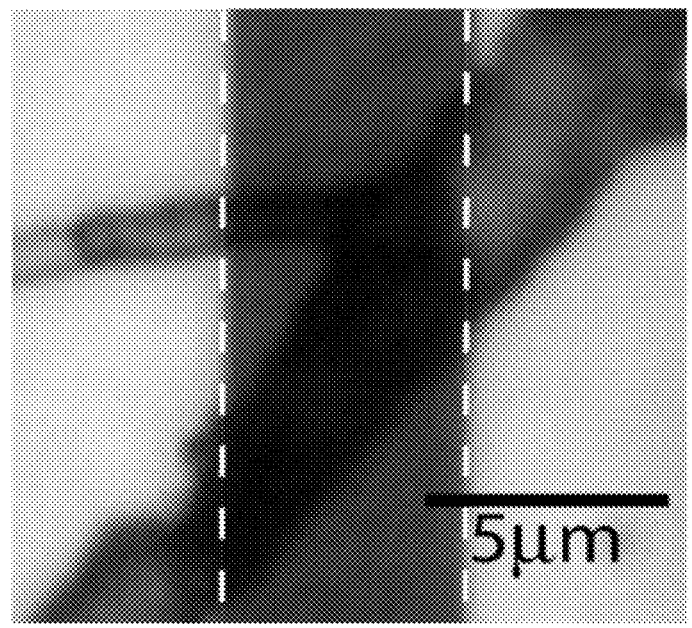
FIG. 3 depicts light emission from fibers deposited on 5 micron spacing interdigitated electrodes (IDEs): top left, bright field image of two fibers spanning an IDE gap (dark region in background); top right, electroluminescence spectrum of light emitted from ELFs; bottom, light emission from the fibers evolves as voltage is increased. Multiple emission zones are formed within a gap for fibers spanning 5 micron IDES.
Figure 3B:
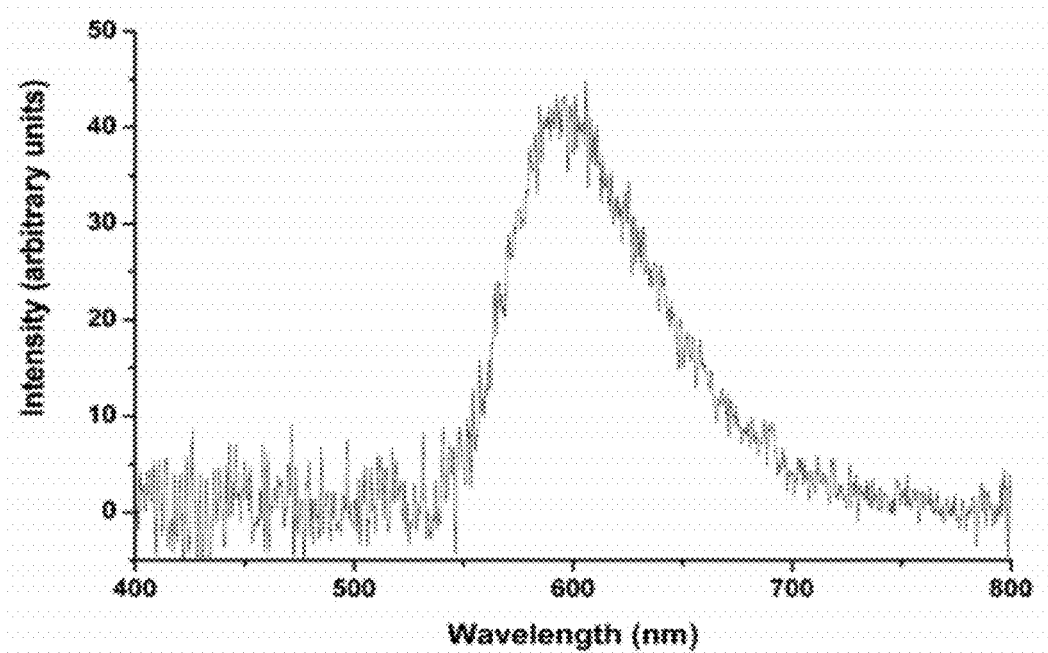
Figure 9A:
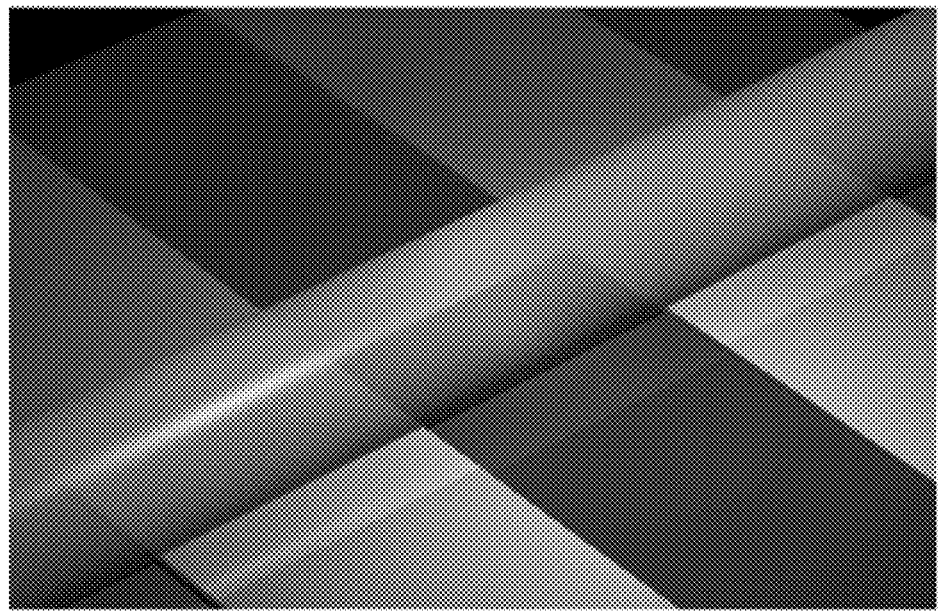
FIG. 9(a) depicts a 3-D drawing of a $[Ru(bpy)_3]^{2+}(PF_6^-)_2$/PEO fiber across gold interdigitated electrodes on a 500 nm device showing luminescence.
Figure 9B:
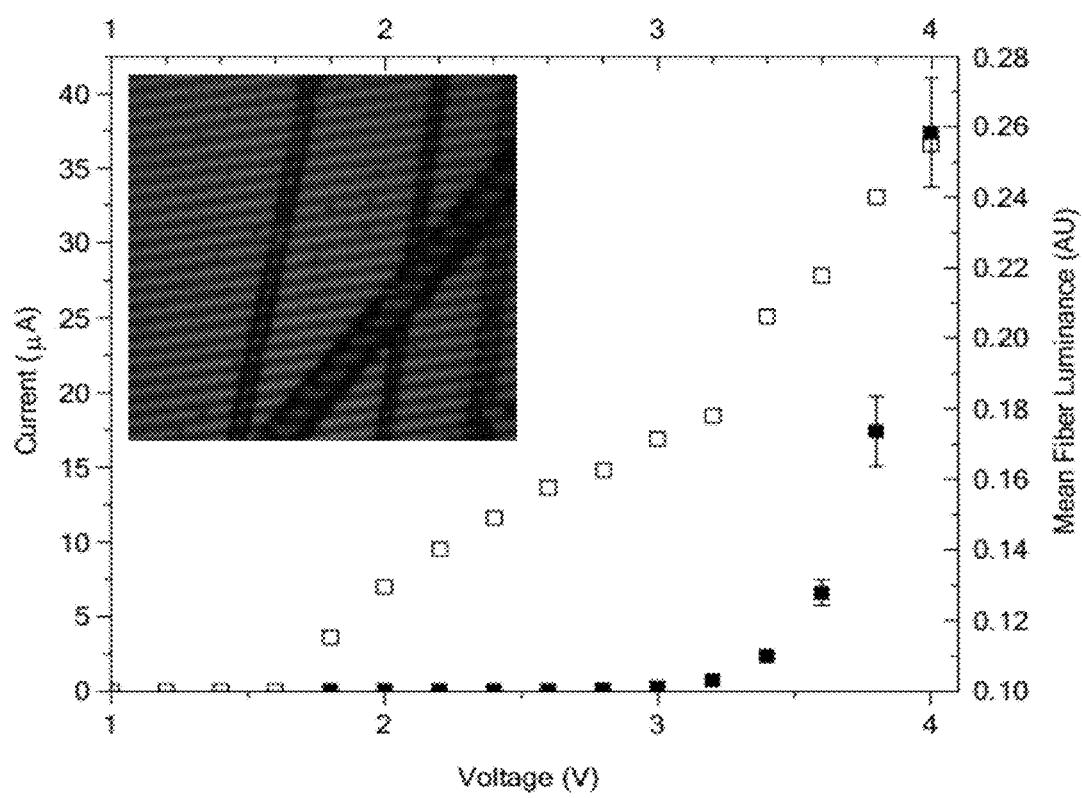
FIG. 9(b) depicts current and light versus voltage characteristic—the graph shows that the turn-on voltage is low (~3 V) and that current activation occurs at about 1.5 V.
Figure 10A:
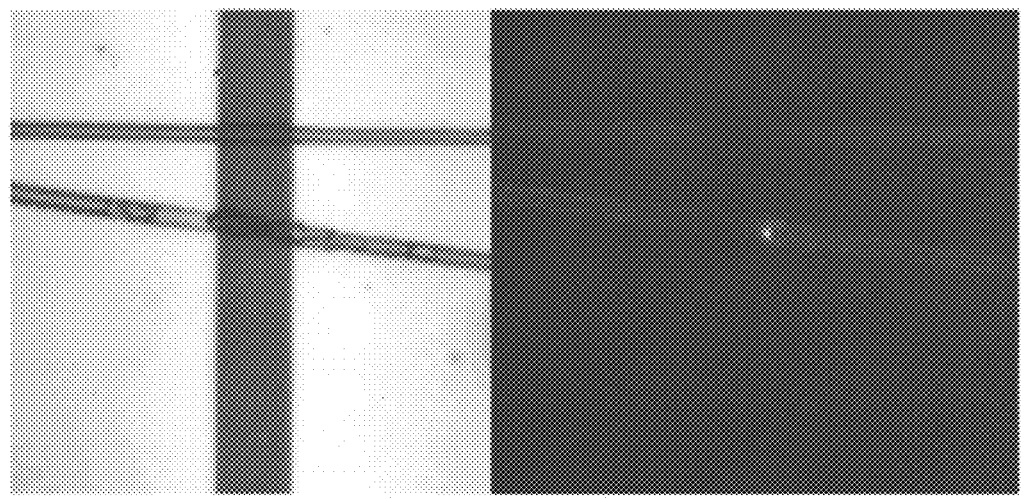
FIG. 10(a) shows that emission is localized—radially confined by the fiber thickness, and axially confined by the operational mechanism.
Figure 10B:
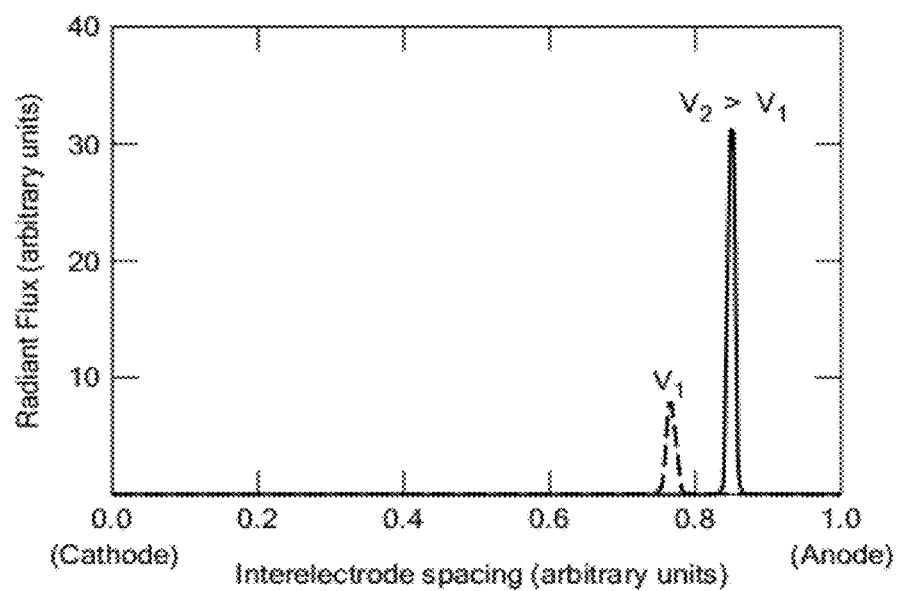
FIG. 10(b) depicts simulated data predicting the axially localized emission.
Figure 10C:
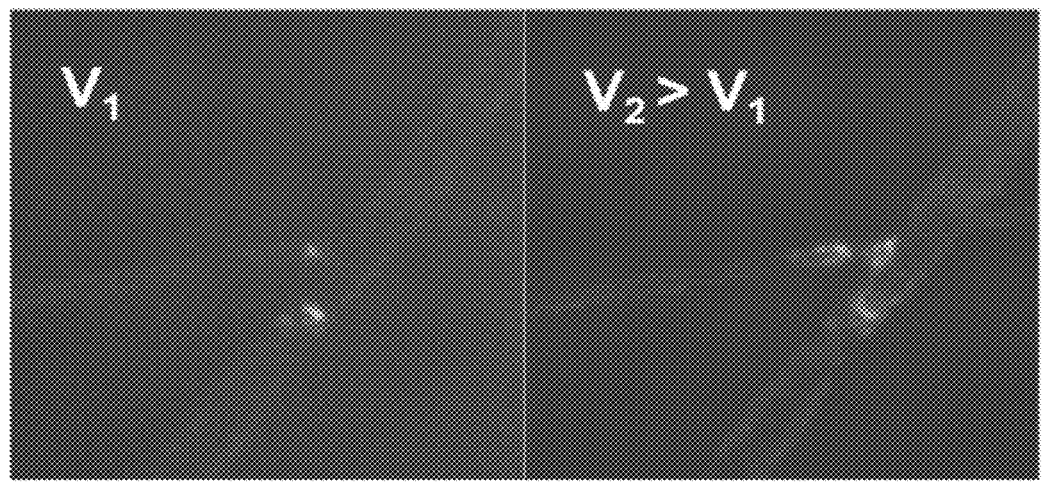
FIG. 10(c) shows that the emission zone can shift with applied voltage.

A silicon substrate comprising a 300-600 nm thermal oxide as an insulating layer with micropatterned gold interdigitated electrodes ("IDEs") on top was used to collect the fibers. Multiple fibers were electrospun onto IDEs with interelectrode spacing of either 500 nm or 5 microns. The electrospun fibers were lit by applying a dc bias across the IDEs in a dry nitrogen atmosphere. In this arrangement, each fiber region spanning the interelectrode gap between a positive and negative electrode could potentially produce a local light-emission zone. Thus, there were several emission zones for the overall IDE device. In all experiments performed, the current passing through the device was monitored as the voltage was ramped up/down and light emission occurred. As each device contained more than one fiber on top of the IDEs, the current recorded was the total current passing through all the fibers deposited on the device. The substrates were imaged on an IX-71 inverted microscope (Olympus), and light emitted from the electrospun luminescent fibers (ELFs) was collected through a 50×0.5 NA LMPlanFI Objective (Olympus) and a D620/60 m emission filter (Chroma). The electroluminescence spectrum for the fibers was captured with a calibrated Ocean Optics S2000 spectrometer. Pictures and video recordings of the emitted light were acquired using a Cascade512 CCD camera (Roper Scientific). Videos recorded from the experiments were analyzed with a custom program written in Matlab (The Mathworks) to extract intensity data form each of the emission zones in a fiber. The light emission was averaged across representative individual light-emitting regions. As shown in FIGS. 2, 9 and 10, the emission from ELFs is highly localized. FIGS. 2(a)-(c) and FIG. 10(a) show the emission from a 1.1 micron thick fiber operating at 50 V on a device having a 5 micron interelectrode spacing. Emission occurs in the interelectrode gap and, in agreement with the operational mechanism described above, the emission spans only a small fraction of the entire 5 micron active region of the device. A fit of the emission profile to a Gaussian reveals a full width at half-maximum (fwhm) amplitude of 540 nm in both the axial and transverse directions in the plane of view. It may be inferred that the out-of-plane dimension is limited by the thickness of the fiber, as observed in the transverse dimension, making these three-dimensional light-emitting point sources. In the same way, FIGS. 2(d)-(f) and FIG. 9(a) show the electroluminescence from an 800 nm diameter fiber lit at 4 V on a device with 500 nm interelectrode spacing. In this case, the intensity profile is smaller—a Gaussian fit of the emitted light reveals an emission area with a 240 nm fwhm along the axial direction and a 325 nm fwhm in the transverse dimension. In reality this emission could be even smaller as the resolution of the measurement is restricted by the diffraction limit of optical microscopy. Because the emission spectrum of the ELFs is centered at 600 nm (See FIG. 3), the highly localized emission restricted to a cross-sectional area of 240×325 $nm^2$ or smaller implies that the fabricated devices operate as subwavelength point sources. This confinement is similar to the smallest visible spectrum, electrically excited light-emitting sources produced to date with much more involved and expensive techniques. FIG. 3 shows the typical luminescent response to an applied bias from fibers spun onto 5 microns IDEs. The voltage for fibers on these electrodes was ramped up from 0 to 130 V using 10 V increments every 15 seconds. The current was found to evolve with time in the periods between voltage increments, a characteristic of devices incorporating mobile ions. Light emission was detected via the CCD camera with voltages as low as 10 V and could be detected by eye in a dark room at 100 V. Light emission appeared at well-defined locations, forming emission zones with dimensions constrained ultimately by the fiber diameter and the fraction of the interelectrode spacing where recombination occurs. As the voltage was increased, more emission zones would frequently appear, resulting in multiple light sources within a fiber and a given IDE gap (See FIG. 3, bottom panel). As shown in FIG. 10, movement of the emission zones with voltage was also observed, an effect noted to occur due to changes in the relative amounts or mobilities of electrons and holes in the device.

Experiment 3

Stability of the iTMC Devices

An experiment to determine the stability of the devices of the invention over time was conducted. Devices with fibers electrospun onto 5 micron IDE gaps were continuously operated under nitrogen at 100 V for a period of 10 hours to assess the device stability. The emission zone imaged during this period retained 75% of its original luminance, while the current increased by 100%. Although some degradation occurred during continuous operation at high voltages, relatively long lifetimes are achieved. Higher device stability for continuous operation in air could be attained by encapsulation of the PEO light-emitting fibers or substitution of the carrier polymer.

Experiment 4

Multiple Fibers Spanning an Interelectrode Gap

ELFs deposited on 500 nm IDEs also emitted light when the bias was increased, with emission at voltages as low as 2.6 V. In these experiments, voltages were typically ramped between 0 and 4 V with 0.2 V increments every 15 seconds. Emission from fibers deposited on 500 nm IDEs did not show multiple emission zones for a given fiber in a particular electrode gap. Instead, these locations showed a homogeneous emission zone, as seen in FIG. 2. For both 5 micron and 500 nm IDEs each electrospun fiber typically spanned several IDE gaps. Thus, light emission could typically be observed from more than one electrode gap in a single fiber (See FIG. 4). This represents an advantage when multiple light sources are required in parallel, where the emission sites would be defined by interelectrode gaps. For a particular interelectrode gap having multiple fibers spanning it, only a fraction of the fibers were found to be emitting, indicating that current preferentially passed along more conducting fiber sections.

Figure 5A:
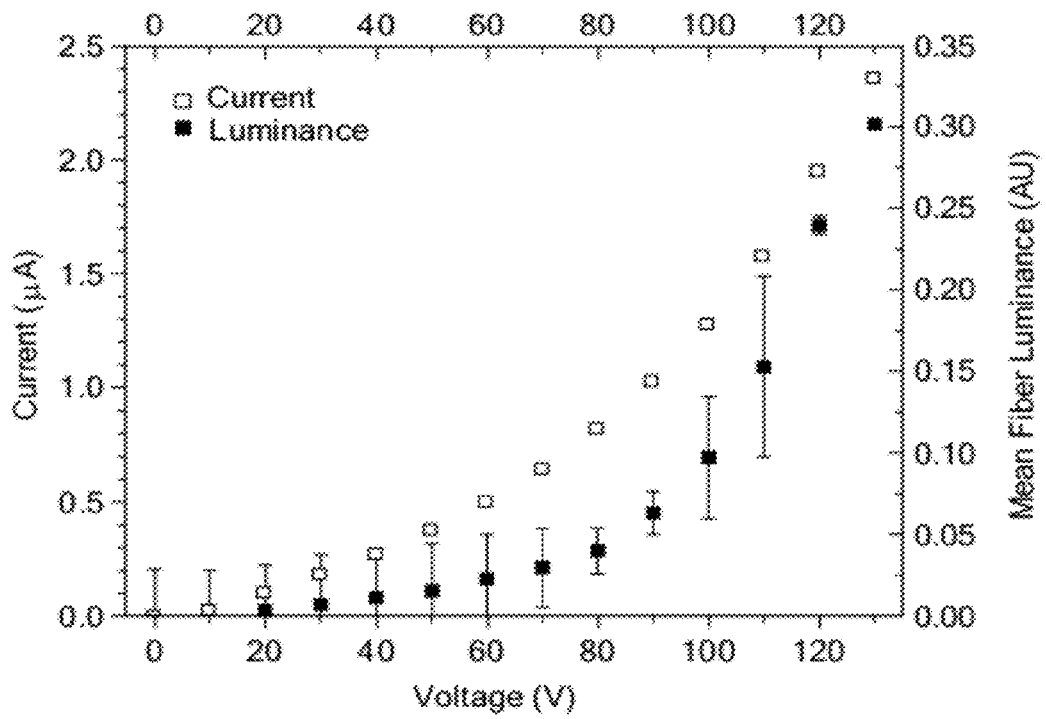
FIG. 5(a) depicts a current-luminance versus voltage plot for fibers on 5 micron IDES. Exponential behavior is observed for both current and luminance.
Figure 5B:
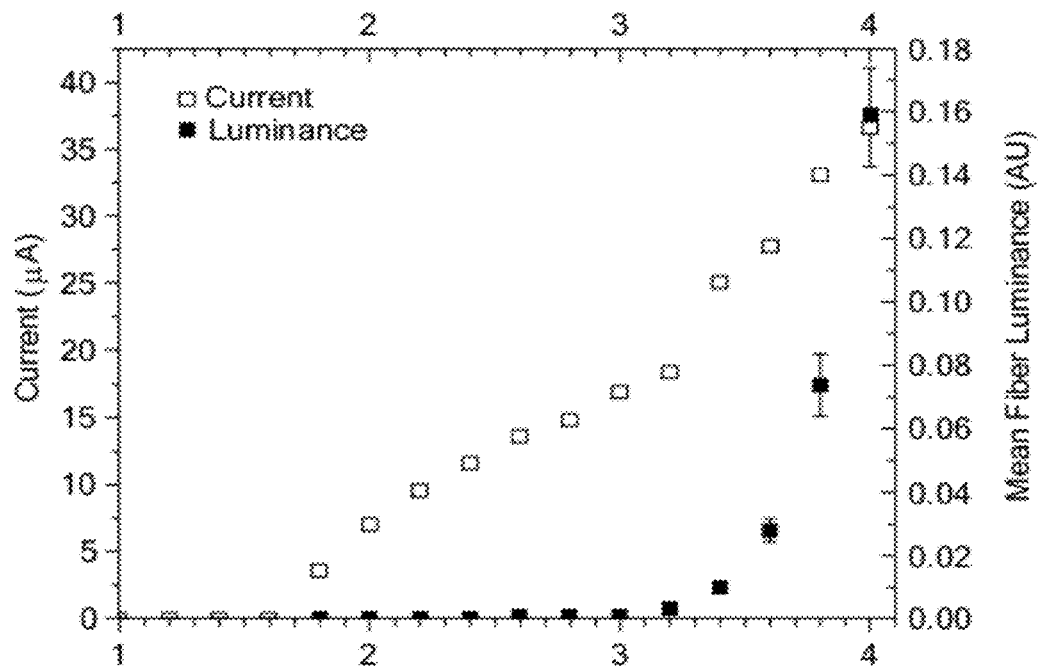
FIG. 5(b) depicts a current-luminance versus voltage plot for fibers on 500 nm IDEs. Two ramping steps are observed for the current, corresponding to first and second carrier injection. Luminance shows exponential behavior.

Current-voltage (I-V) and luminance-voltage (L-V) plots were extracted from data collected from multiple fibers. Typical results for 5 micron and 500 nm interelectrode spacing are shown in FIG. 5. In these plots, current is reported for the entire IDE array, and luminance is reported for a single, representative emission zone. For 5 micron IDEs, current and light emission followed an exponential trend, with distinguishable turn-on occurring near 10 V. By reduction of the interelectrode spacing to 500 nm, lower voltage operation was achieved (See FIG. 5(b)). For these devices, the turn-on voltage is reduced to 3.2 V, with a subsequent exponential increase of the luminance with higher voltages. Interestingly, the current shows a two-step ramping behavior, which corresponds to monopolar and bipolar injection regimes. Upon application of the voltage, $PF_{6-}$ ions redistribute, leading to the onset of monopolar injection at 1.7 V. As the bias is increased, the monopolar current continues to increase in an exponential fashion until sufficient $PF_{6-}$ motion has occurred to establish the second carrier injection at 3.2 V, initiating the onset of light emission Experiment 5

The Effect of Ion Redistribution

To determine whether ion redistribution influences the observed current and luminance behavior in the current response from fibers electrospun onto 500 nm IDEs, sequential voltage scans were performed and the current and luminance followed. The voltage was ramped up, held at 4 V for 10 minutes (allowing the current to reach a steady state), and then ramped down and held at 0 V for 10 minutes. If the observed behavior was due to ion-assisted injection, the downward voltage ramp should reveal new current features as significantly more ionic space charge should be concentrated at the contacts. It is presumed that the ion mobility is too slow for significant $PF_6^-$—ion redistribution to occur on the downward scan on these time scales relative to the ionic distribution obtained on the 10 minutes of charging. Thus, for the time scales involved, the current should reflect exponential relaxation as the voltage is ramped down, similar to a conventional LED.

Figure 6:
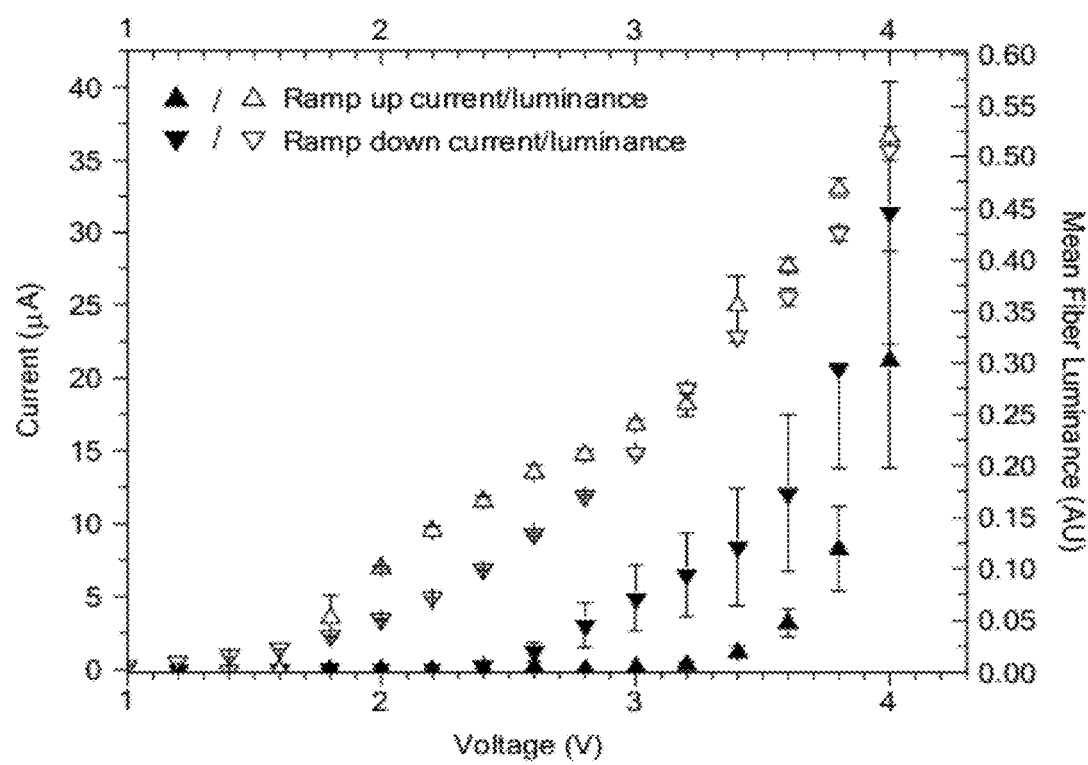
FIG. 6 shows that ramp-up/down of the bias applied to fibers deposited on 500 nm IDEs reveals that the two steps observed in current measurements are a result of ion motion. Error bars on current measurements reflect three current readouts over the 15 s period in which the bias is applied. Error bars on luminance measurements are the standard deviation from measurements performed at nine emission zones in a single fiber.

FIG. 6 shows the experiment for one such scan for a single fiber spanning several 500 nm IDE gaps. The data reflect the total current going through the device and the luminance observed from nine individual emission zones that lit up in the field of view. The current behavior as the voltage was ramped up showed two-step operation consistent with the observations discussed above. Luminance was detectable on the ramp-up at voltages above 3.2 V. The device was maintained at 4 V for 10 minutes, and then the voltage was ramped down. As the voltage was ramped down, a single step was observed for the current, consistent with our hypothesis of ion-assisted injection. The luminance also decreased in an exponential fashion and could be detected with voltages as low as 2.6 V, lower than the 3.2 V turn-on voltage observed on the ramp up. This shift in the onset of emission upon the ramp up and the ramp down can be explained on the basis of ion motion. Namely, the device continues to emit on the ramp down due to the slow relaxation of ions to/from the electrodes, which continue to assist charge injection. This behavior was reproduced for subsequent scans two-steps in the current as the voltage was ramped up, and exponential relaxation of the current as the voltage was ramped down. Hence, the observed I-V and L-V characteristics can be understood in terms of ion space charge effects.

Experiment 6

Arrays of Emitters

Figure 7:
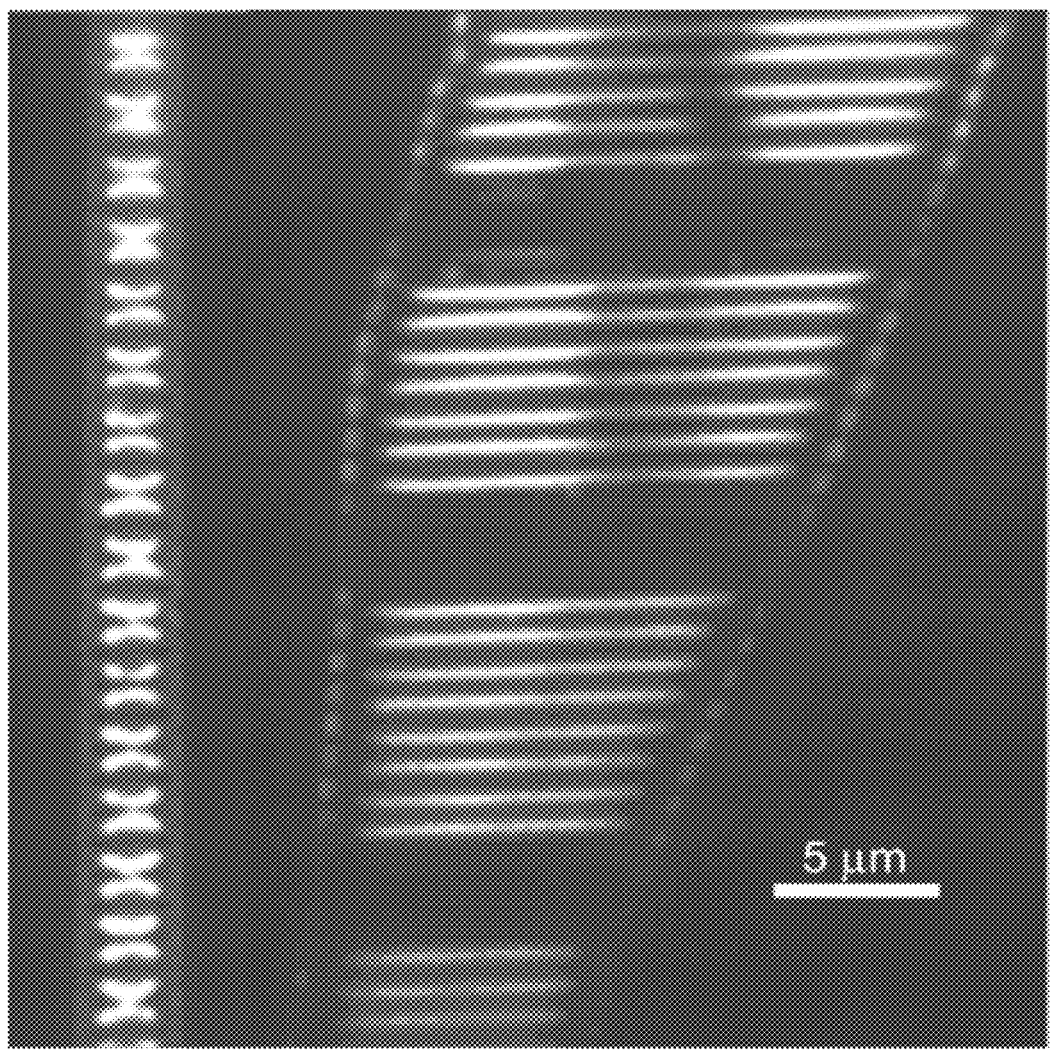
FIG. 7 shows PMMA-$[Ru(bpy)_3]^{2+}(PF_6^-)_2$ fibers lit up by applying a DC bias under nitrogen atmosphere. Electrode gaps correspond to 500 nm.
Figure 8:
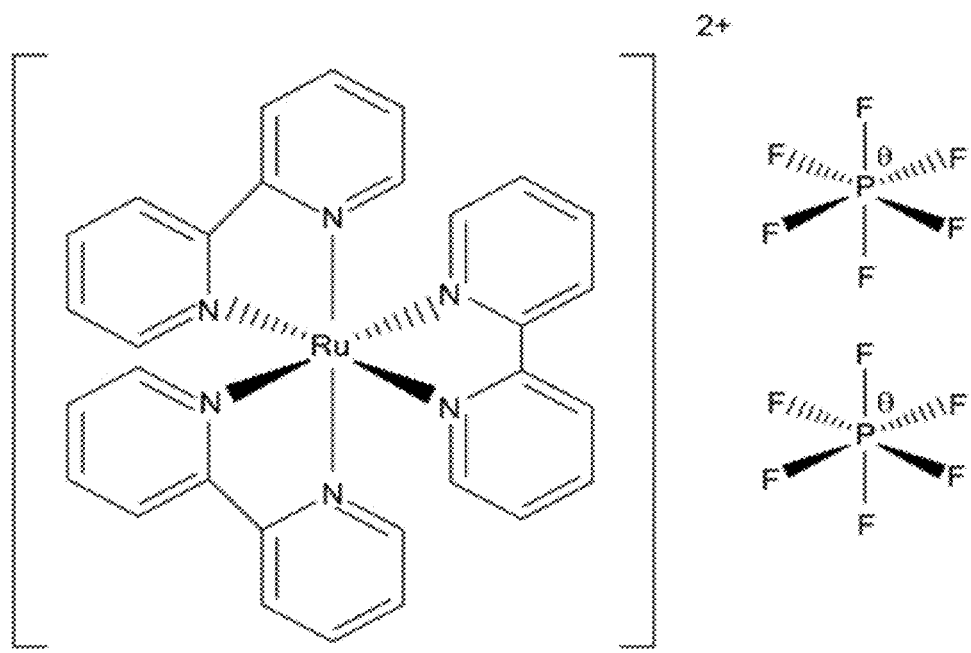
FIG. 8 shows the typical structure of the metal transition complex light emitting component as illustrated by $[Ru(bpy)_3]^{2+}(PF_6^-)_2$.

The transition metal complex $[Ru(bpy)_3]^{2+}(PF_6^-)_2$ was blended with polymethyl-methacrylate ("PMMA"). Fibers were created using electrospinning techniques described herein, and deposited on a silicon substrate with gold interdigitated electrodes such that the fibers were parallel to each other so as to form an array. A voltage was then applied, successfully lighting up the fibers (See FIG. 7) such that over 90% of the junctions lit up. It was noted that the PMMA fibers are tend to be highly uniform, both structurally and in terms of light emission, thus making such fibers optimal for the production of large arrays of emitters (sequences of lights up to millimeters long).

Numerous references, including patents and various publications, are cited and discussed in the description of this invention. The citation and discussion of such references is provided merely to clarify the description of the present invention and is not an admission that any reference is prior art to the invention described herein. All references cited and discussed in this specification are incorporated herein by reference in their entirety. Variations, modifications and other implementations of what is described herein will occur to those of ordinary skill in the art without departing from the spirit and scope of the invention. While certain embodiments of the present invention have been shown and described, it will be obvious to those skilled in the art that changes and modifications may be made without departing from the spirit and scope of the invention. The matter set forth in the foregoing description and accompanying drawings is offered by way of illustration only and not as a limitation. The actual scope of the invention is intended to be defined in the following claims.

What is claimed is:

1. An electrospun light-emitting fiber (ELF) comprising an electroluminescent material and a carrier substance, wherein the electroluminescent material is solution processahle and embedded in the carrier substance, wherein the ELF emits a localized light three-dimensionally confined to nanometer scale dimensions when subject to an operating voltage ranging from about 1V to about 10V.

2. The ELF of claim 1, wherein the localized light is three-dimensionally confined to an emission zone of sub-wavelength dimensions.

3. The ELF of claim 1, wherein the electroluminescent material is an electroluminescent organic material.

4. The ELF of claim 3, wherein the electroluminescent organic material is a mixed conductor.

5. The ELF of claim 4, wherein the mixed conductor is an ionic transition metal complex (iTMC) or a transition metal coordination compound.

6. The ELF of claim 5, wherein the ELF comprises as plurality of iTMCs.

7. The ELF of claim 5, wherein the iTMC comprises transition metal ions and ligands.

8. The ELF of claim. 1, wherein the carrier substance is a polymeric substance.

9. The ELF of claim 8, wherein the polymeric substance is chosen from a group consisting of conjugated polymers, copolymers, block co-polymers, partially cross-linked polymers, biodegradable polymers including poly(propylene fumarate) (PPF) polymethyl-methacrylate (PMMA), tyrosine-derived polymers, segmented polyurethane-based polymers, polyphosphoesters, polyphosphazenes, polyanhydrides, polyethers, poly(ortho esters), polycarbonates, polyvinyl alcohols, polyvinyl acetates, polystyrenes, polyglycolic acids, polylactic acids, water-soluble vinyl polymers and dendrimers.

10. The ELF of claim 9, wherein the polyether is chosen from the group consisting of polyethylene oxide (PEO), polyethylene glycol (PEG), polypropylene oxide (PEP) and their co-polymers.

11. The ELF of claim 10, wherein the copolymer is poly (ethylene glycol-co-propylene oxide) (PEG-PPO).

12. The ELF of claim 8, wherein the water-soluble vinyl polymer is chosen from the group consisting of polyvinyl alcohol (PVA), polyvinyl ether and polyvinyl pyrrolidone.

13. The ELF of claim 10, wherein the carrier substance is PE0 and the iTMC is ruthenium(ll) tris(bipyridine)hexafluorophosphate.

14. The ELF of claim 1, wherein the diameter of the ELF is between about 10.0 nm to about 50.0 microns.

15. The ELF of claim 14, wherein the diameter of the ELF is between about 75.0 nm to about 1000.0 nm.

16. The ELF of claim 15, wherein the diameter of the ELF is between about 100.0 nm to about 600.00 nm.

17. The ELF of claim 16, wherein the diameter of the ELF is between about 200.0 to about 400.0 nm.

18. The ELF of claim 1, wherein the operating voltage ranges from about 2 to about 8 V.

19. The ELF of claim. 18, wherein the operating voltage ranges from about 3 to about 4 V.

20. The ELF of claim 1. wherein the localized light is localized to a planar dimension between about $10^2$ to about $10^6 nm^2$.

21. The ELF of claim 20, wherein the localized light is localized to a planar dimension between about $10^2$ to about $10^4 nm^2$.

22. The ELF of claim 21, wherein the localized light is localized to a planar dimension between about $10^2$ to about $10^3$ nm$^2$.

23. The ELF of claim 22, wherein the localized light is localized to a planar dimension between $10^2$ to $2\times10^2$ nm$^2$.

24. The ELF of claim 1, wherein the ELF is encapsulated.

25. A device comprising at least one ELF of claim 1 deposited on a substrate comprising at least two interdigitated conducting electrodes, such that the localized light emission occurs along the ELF in the interelectrode gaps between the interdigitated conducting electrodes.

26. The device of claim 25, wherein the interelectrode gaps between the interdigitated conducting electrodes are between about 500 nm and about 5.0 microns.

27. The device of claim 25, comprising a plurality of ELFs.

28. The device of claim 27, wherein the ELFs are parallel to each other.

29. The device of claim 27, wherein at least one ELF intersects a second ELF.

30. The device of claim 28 or 29, wherein the ELFs form an array.

31. An electrospun light-emitting fiber (ELF) comprising an electroluminescent organic material and a carrier substance, wherein the electroluminescent organic material is solution processable and embedded in the carrier substance, and wherein the electroluminescent organic material is a mixed conductor.

32. The ELF of claim 31, wherein the mixed conductor is an ionic transition metal complex (iTMC) or a transition metal coordination compound.

33. The ELF of claim 31, wherein the ELF comprises a plurality of iTMCs.

34. The ELF of claim 32, wherein the iTMC comprises transition metal ions and ligands.

35. The ELF of claim 31, wherein the carrier substance is a polymeric substance.

36. The ELF of claim 35, wherein the polymeric substance is chosen from a group consisting of conjugated polymers, copolymers, block co-polymers, partially cross-linked polymers, biodegradable polymers including poly(propylene fumarate) (PPF) polymethyl-methacrylate (PMMA), tyrosine-derived polymers, segmented polyurethane-based polymers, polyphosphoesters, polyphosphazenes, polyanhydrides, polyethers, poly(ortho esters), polycarhonates, polyvinyl alcohols, polyvinyl acetates, polystyrenes, polyglycolic acids, polylactic acids, water-soluble vinyl polymers and dendrimers.

* * * * *